O. M. Brown.
Furnace for Heating Tires.
Nº 38,029.   Patented Mar. 31, 1863.
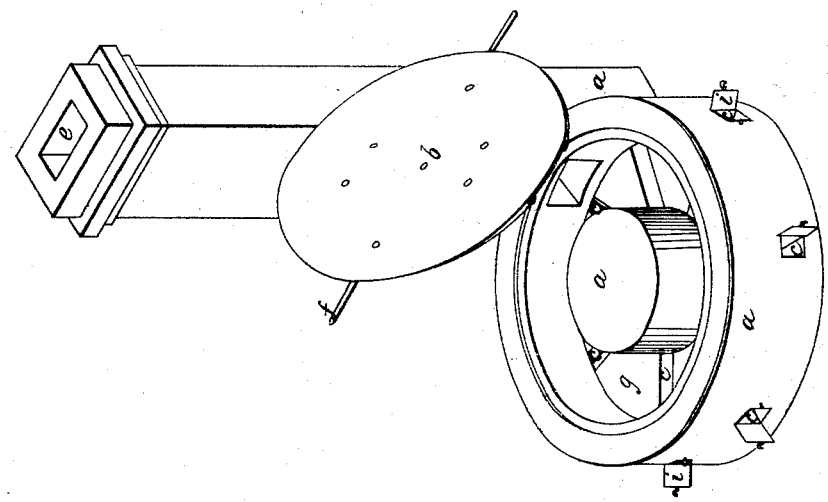
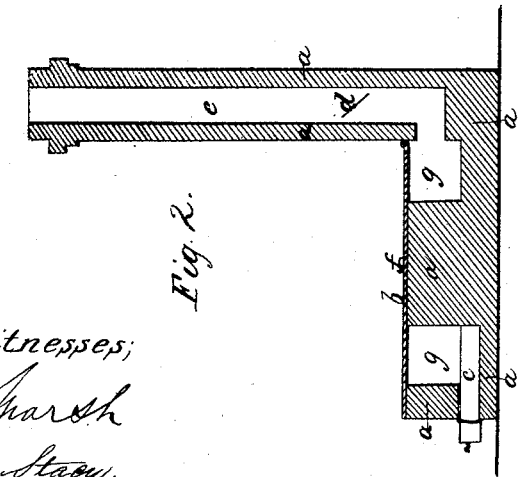
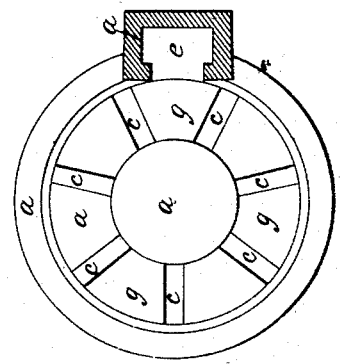
Witnesses;
W. Marsh
S. W. Stacy.
Inventor;
Oliver M. Brown
per Daniel Breed

UNITED STATES PATENT OFFICE.

OLIVER M. BROWN, OF TOLEDO, OHIO.

IMPROVEMENT IN FURNACES FOR HEATING TIRES.

Specification forming part of Letters Patent No. 38,029, dated March 31, 1863.

*To all whom it may concern:*

Be it known that I, OLIVER M. BROWN, of Toledo, in the county of Lucas and State of Ohio, have invented a new and useful Improvement in Furnaces or Tire-Arches; and I do hereby declare that the following is a full and exact description thereof, reference being had to the accompanying drawings, and to the letters of reference marked thereon.

My invention consists in a peculiar construction of furnace or tire-arch for heating tires to be set upon the wheels, and for other similar purposes.

In the accompanying drawings, Figure 1 is an isometric perspective view of my furnace, the cover being raised to show the interior. Fig. 2 is a vertical section of the same. Fig. 3 is a plan of my furnace.

The main portion of the furnace and its chimney may be best made of brick-work, as seen at $a$ $a$, the base of the body of the furnace being circular and having an annular space or fire-box, $g$, to receive the fuel and the iron to be heated. This furnace is provided on every side with draft-flues $c$ $c$, having doors $i$ $i$, for regulating the heat, and also with a chimney, $e$, having a damper, $d$. The top of the furnace has a cover, $b$, hinged near the chimney and provided with a handle, $f$, so as to be turned up out of the way at pleasure.

The operation of my furnace or tire arch is as follows: Some shavings or other kindling materials are placed in the draft-flues $c$, then the tire or other annular iron is laid into the fire-box $g$, and covered with wood or other suitable fuel. The cover $b$ is now closed down and the kindlings ignited in the various flues, thus setting the whole furnace in blast and heating the entire circle at the same time. When the iron is heated, the draft-doors I may be closed and the tire taken out and applied to the wheel; or the iron may be left in the furnace, where it will remain heated in readiness for the workmen when they desire to use the same.

The details of my tire-arch may be somewhat varied without departing from my invention, so long as the same results are obtained.

I am aware that circular furnaces are not new, and I also know that flues are often provided with doors for controlling the fire, but I believe that a circular furnace provided with such flues is an improvement upon anything heretofore known.

Having thus described my invention, what I claim, and desire to secure by Letters Patent of the United States, is—

The above-described furnace as a new article of manufacture, the same being provided with a peculiar arrangement of flues with doors, in the manner and for the purposes set forth.

OLIVER M. BROWN.

In presence of—
J. T. NEWTON,
JAMES H. WELD.